United States Patent
Guo et al.

(10) Patent No.: US 9,785,282 B2
(45) Date of Patent: Oct. 10, 2017

(54) TOUCH PANEL

(71) Applicant: Shenzhen China Star Optoelectronics Technology Co., Ltd., Shenzhen, Guangdong (CN)

(72) Inventors: Xingling Guo, Guangdong (CN); Jinjie Zhou, Guangdong (CN); Yujie Bai, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 142 days.

(21) Appl. No.: 14/422,677

(22) PCT Filed: Jan. 6, 2015

(86) PCT No.: PCT/CN2015/070229
§ 371 (c)(1),
(2) Date: Feb. 19, 2015

(87) PCT Pub. No.: WO2016/090721
PCT Pub. Date: Jun. 16, 2016

(65) Prior Publication Data
US 2016/0342272 A1 Nov. 24, 2016

(30) Foreign Application Priority Data
Dec. 11, 2014 (CN) .......................... 2014 1 0765119

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
USPC .... 345/173, 174, 211, 212; 349/12, 33, 149; 200/309, 600; 341/22
See application file for complete search history.

(56) References Cited

U.S. PATENT DOCUMENTS

| | | | | | |
|---|---|---|---|---|---|
| 4,377,049 | A | * | 3/1983 | Simon | ....................... G09F 3/18 |
| | | | | | 200/309 |
| 4,698,460 | A | * | 10/1987 | Krein | ...................... G06F 3/045 |
| | | | | | 345/173 |
| 5,053,757 | A | * | 10/1991 | Meadows | ............... G06F 3/044 |
| | | | | | 341/22 |

(Continued)

*Primary Examiner* — Prabodh M Dharia
(74) *Attorney, Agent, or Firm* — Andrew C. Cheng

(57) ABSTRACT

The present invention discloses a touch panel, comprising: a substrate, a touch unit array, a plurality of connection wires, an impedance adjusting unit and controller. The impedance adjusting unit and the controller are arranged on the substrate, the touch unit array connects to the impedance adjusting through the plurality of connection wires, the impedance adjusting unit connects to the controller, the impedance adjusting unit is processing adjustment to impedance of each connection wires to make impedance of each connection wires consistent. The touch panel of the present invention will adjust impedance of each connection wire to be consistent for improving the sensing precision of touch location of touch panel.

10 Claims, 4 Drawing Sheets

(56) References Cited

U.S. PATENT DOCUMENTS

| Patent/Pub. No. | Date | Inventor | Classification |
|---|---|---|---|
| 8,872,789 B2* | 10/2014 | Lee | G06F 3/0418 345/174 |
| 2007/0262966 A1* | 11/2007 | Nishimura | G06F 3/044 345/173 |
| 2011/0048914 A1* | 3/2011 | Hsu | G06F 3/047 200/600 |
| 2011/0085122 A1* | 4/2011 | Fu | G02F 1/13338 349/149 |
| 2011/0157082 A1* | 6/2011 | Lin | G06F 3/045 345/174 |
| 2011/0273399 A1* | 11/2011 | Lee | G06F 3/0418 345/174 |
| 2012/0050204 A1* | 3/2012 | Kao | G06F 3/044 345/174 |
| 2012/0280965 A1* | 11/2012 | Lee | G09G 3/3677 345/212 |
| 2013/0076648 A1* | 3/2013 | Krah | G06F 3/0412 345/173 |
| 2013/0082724 A1* | 4/2013 | Noda | H02S 50/10 324/750.01 |
| 2013/0265242 A1* | 10/2013 | Richards | G06F 3/044 345/173 |
| 2014/0002369 A1* | 1/2014 | Guard | G06F 3/044 345/173 |
| 2014/0043260 A1* | 2/2014 | Wang | H05K 1/111 345/173 |
| 2014/0111707 A1* | 4/2014 | Song | G06F 3/044 349/12 |
| 2014/0176840 A1* | 6/2014 | Hashido | G02F 1/13306 349/33 |
| 2014/0204043 A1* | 7/2014 | Lin | G06F 3/0416 345/173 |
| 2014/0375600 A1* | 12/2014 | Pan | G06F 3/0418 345/174 |
| 2014/0375909 A1* | 12/2014 | Misaki | G06F 3/044 349/12 |
| 2015/0029423 A1* | 1/2015 | Huang | G06F 3/047 349/12 |
| 2015/0234492 A1* | 8/2015 | Lu | G06F 3/044 345/174 |
| 2015/0379965 A1* | 12/2015 | Kim | G09G 5/14 345/211 |
| 2016/0026299 A1* | 1/2016 | Kitada | G06F 3/044 345/174 |
| 2016/0139708 A1* | 5/2016 | Tseng | G06F 3/044 345/174 |

* cited by examiner

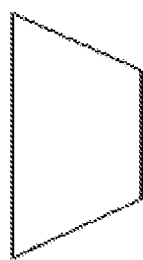
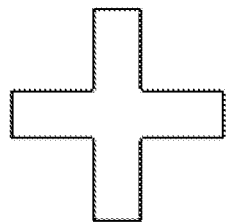
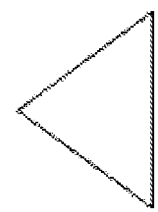
Fig. 6a  Fig. 6b  Fig. 6c
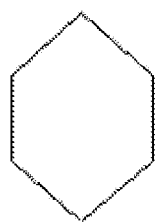
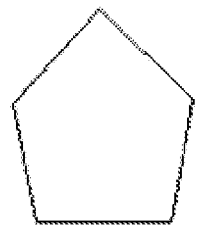
Fig. 6d  Fig. 6e

TOUCH PANEL

FIELD OF THE INVENTION

The invention relates to a touch paned technical field, and in particular to a touch panel which can adjust the impedance consistence to connection wires to a touch panel.

BACKGROUND OF THE INVENTION

Touch panels are input equipments to allow users to input user commands through choosing command contents displaying on screens of pictorial displays by fingers or objects. The fingers or the objects of users touch touch panels directly at touching places. Because these touch panels can instead of independent inputting equipments like keyboards or mouses and etc. to connect with pictorial displays, application fields of touch panels are getting broadening day by day.

Touch panels can be divided into four classifications by working principles of touch panels, and they are resistive type touch panels, capacitive type touch panels, infrared type touch panels and surface acoustic wave type touch panels. In recent years, the capacitive type touch panels with multi-touch receive the most attention.

A traditional capacitive type touch panel comprises a touch unit array, and a touch unit array comprises a plurality of X direction sensing series and a plurality of Y direction sensing series. Wherein, the X direction sensing series and the Y direction sensing series comprise a plurality of sensing pads, thus touch locations of users can be sensed precisely. Two adjacent sensing pads are connected by applied bridging wires at intersections of the X direction sensing series and the Y direction sensing series. Therefore, forming shorting can be prevented at the intersections of the X direction sensing series and the Y direction sensing series.

When a controller processes replied touch signals from connection wires, a sensing accuracy of touching position is affected by an impedance of every connection wire. At present technology, usually every X direction sensing series is directly connected to the controller by a corresponding connection wire, and also every Y direction sensing series is connected directly to the controller by a corresponding connection wire. However, because of a factor of a space position of the touch panel, every distance between every connection wire and the controller is different from each other, and thus every length of every connection wires is not the same and then every impedance of every connection wire is turned into diverse, therefore the sensing accuracy of touching position is decreasing.

SUMMARY

In order to solve the present technical problems as above, a purpose of invention is to provide a touch panel, comprising a substrate, a touch unit array, a plurality of connection wires, an impedance adjusting unit and controller. The impedance adjusting unit and the controller are arranged on the substrate, the touch unit array connects to the impedance adjusting through the plurality of connection wires, the impedance adjusting unit connects to the controller, and the impedance adjusting unit is processing adjustment to impedance of each connection wires to make impedance of each connection wires consistent.

Further, the impedance adjusting unit comprises; a plurality of paralleled resistor units, wherein, each of connection wires connects to a corresponding parallel resistor unit, and the plurality of parallel resistor unit connect to the controller.

Further, the parallel resistor unit comprises; a plurality of controllable switches and a plurality of resistors in parallel, wherein, each of the resistors connects to the controller through the corresponding controllable switch.

Further, the touch paned comprises; a switching control unit, wherein, the switching control unit is arranged on the substrate, and the switching control unit is used to control the controllable switch for turning on or turning off.

Further, both the impedance adjusting unit and the switching control unit are embedded in the controller.

Further, the substrate is a color filter substrate or a thin film transistor array substrate.

Further, the touch unit array comprises: a plurality of first direction sensing series: the plurality of first direction sensing series separates from each other, each first direction sensing series comprises a plurality of first sensing pads in series and a plurality of first bridging wires, each first bridging wire cascades an adjacent first sensing pad, and each first direction sensing series connects to the impedance adjusting unit through the corresponding connection wire; a plurality of second direction sensing series: the plurality of second direction sensing series separate from each other, each second direction sensing series comprises a plurality of second sensing pads in series and a plurality of second bridging wires, each second bridging wire cascades an adjacent second sensing pad, and each second direction sensing series connects to the impedance adjusting unit through the corresponding connection wire, wherein, the first bridging wire and the second bridging wire are arranged on different layer.

Further, the first sensing pad, the second sensing pad and the first bridging wire are arranged on the same layer.

Further, the first sensing pad, the second sensing pad and the second bridging wire are arranged on the same layer.

Further, shapes of the first sensing pad and/or the second sensing pad are diamond shaped, trapezoid shaped, cruciform shaped, triangle shaped, hexagon shaped or pentagon shaped.

The touch panel of the present invention will adjust an impedance of each connection wire to be consistent for improving the sensing precision of touch location of touch panel.

BRIEF DESCRIPTION OF THE DRAWING

Other aspects, features and advantages of embodiments of the present invention will be apparent from the following detailed description taken in connection to the accompanying drawings. In the drawings:

FIG. 6a to FIG. 6e are shaped schematic views of a first sensing pad and/or a second sensing pad according to several embodiments of the present invention;

DETAILED DESCRIPTION OF THE EMBODIMENTS

Figure 1:
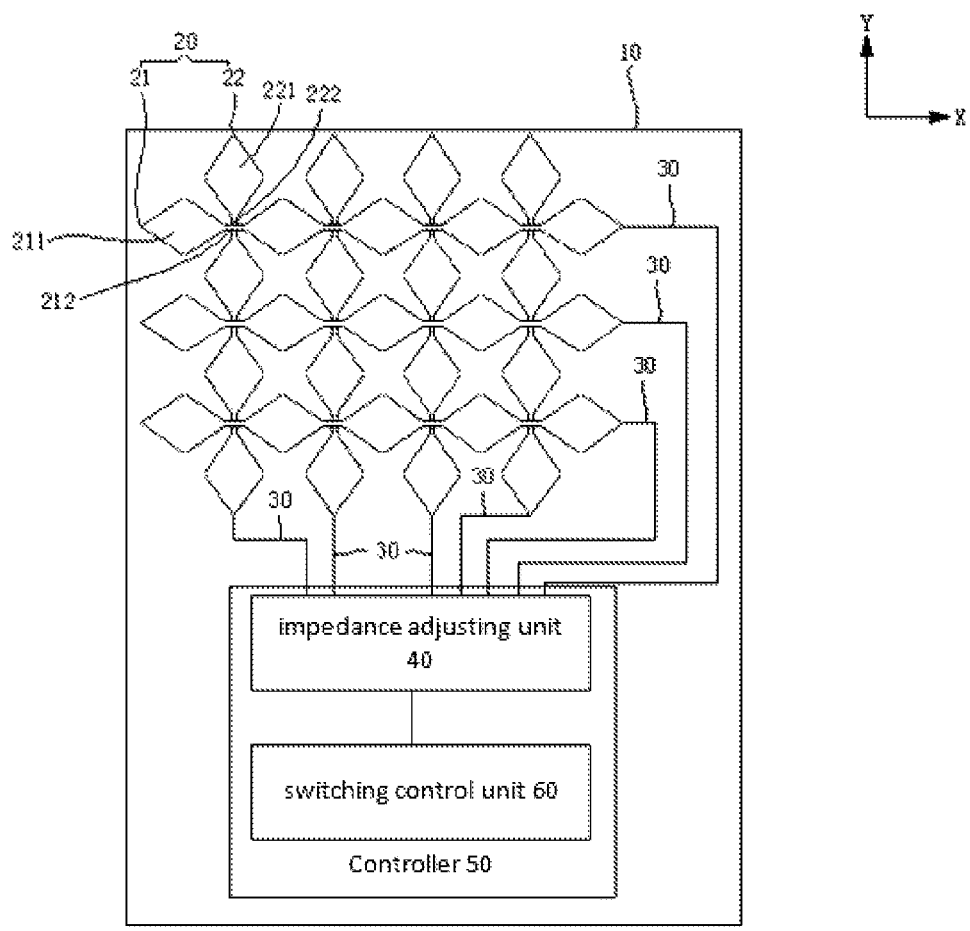
FIG. 1 is a top schematic view of a touch panel according to an embodiment of the present invention.

Hereinafter, detailed descriptions will be set forth for embodiments of the invention in conjunction with the accompanying drawings. However, there are many different ways to practice the present invention, and the present invention should not be explained to limit the described embodiment hereinafter. On the contrary, these provided embodiments are for explain principles and the practical applications of the present invention for those skilled in the art understanding various embodiments of the present invention and various modifications of properly specific expectation.

In the drawings, the same reference numerals will be used throughout to designate the same of like elements. It will be understood that, although the terms first, second, etc. may be used hereinto describe various elements, these elements should not be limited by these terms. There terms are only used to distinguish one element from another.

FIG. 1 is a top schematic view of a touch panel according to an embodiment of the present invention.

Refer to FIG. 1, according to the touch panel of an embodiment of the invention comprises the substrate 10, the touch unit array 20, the plurality of connection wires 30, the impedance adjusting unit 40 and the controller 50. The touch unit array 20, the plurality of connection wires 30, the impedance adjusting unit 40 and the controller 50 are all arranged on the substrate 10.

The touch unit array 20 comprises the plurality of first direction sensing series 21 and the second direction sensing series 22.

The first direction sensing series 21 substantially extends to a first direction X. These first direction sensing series 21 separate from each other. In other words, two adjacent first direction sensing series 21 don't connect to each other. Each of the first direction sensing series comprises a plurality of first sensing pads 211 in series and a plurality of first bridging wires 212, each of the first bridging wires 212 cascades two adjacent first sensing pads 211. In addition, in present embodiment, an amount of the first direction sensing series 21 for example is three, but the present invention is not limited hereto, and the amount of the first direction sensing series 21 can be more than three.

The second direction sensing series 22 substantially extends to a second direction Y. The second direction sensing series 22 separates from each other. In other words, two adjacent second direction sensing series 21 don't connect to each other. Each of the second direction sensing series 22 comprises a plurality of second sensing pads 221 in series and a plurality of second bridging wires, and each of the second bridging wires 212 cascades two adjacent second sensing pads 221. In addition, in the present embodiment, an amount of the second direction sensing series 22 is, for example: four, but the present invention is not limited hereto, the amount of the second direction sensing series 2s can be more than four. Here, the first sensing pad 211 and the second sensing pad 221 will be arranged at different layer.

Each of the direction sensing series 21 is connected to the impedance adjusting unit 40 by the corresponding connection wire 30, and each second direction sensing series 22 is connected to the impedance adjusting unit 40 by the corresponding connection wire 30. That is, an amount of the connection wires 30 is equal to a sum of the amount of the first direction sensing series 21 and the second direction sensing series 22.

The impedance adjusting unit 40 is connected to the controller 50. In the present embodiment, the impedance adjusting unit 40 embedded in the controller 50 is to improve integrity of the controller 50, but the present invention is not limited hereto, the impedance adjusting unit 40 is also arranged at the substrate 10, and then arranged outside of the controller 50. Thus, the impedance adjusting unit 40 processes adjustment impedance of each connection wires 30 to make impedance of each connection wire consistent for improving the sensing precision of touch location of touch panel.

Because other components inside the controller 50 according to the embodiment of the present invention are equal to those of the present technologies, it is not detail described hereinafter. Detailed descriptions are processed for impedance adjusting unit 40 according to the embodiment of the present invention as below. An inner arrangement of the impedance adjusting unit 40 according to the embodiments of the present invention is shown as FIG. 2.

Figure 2:
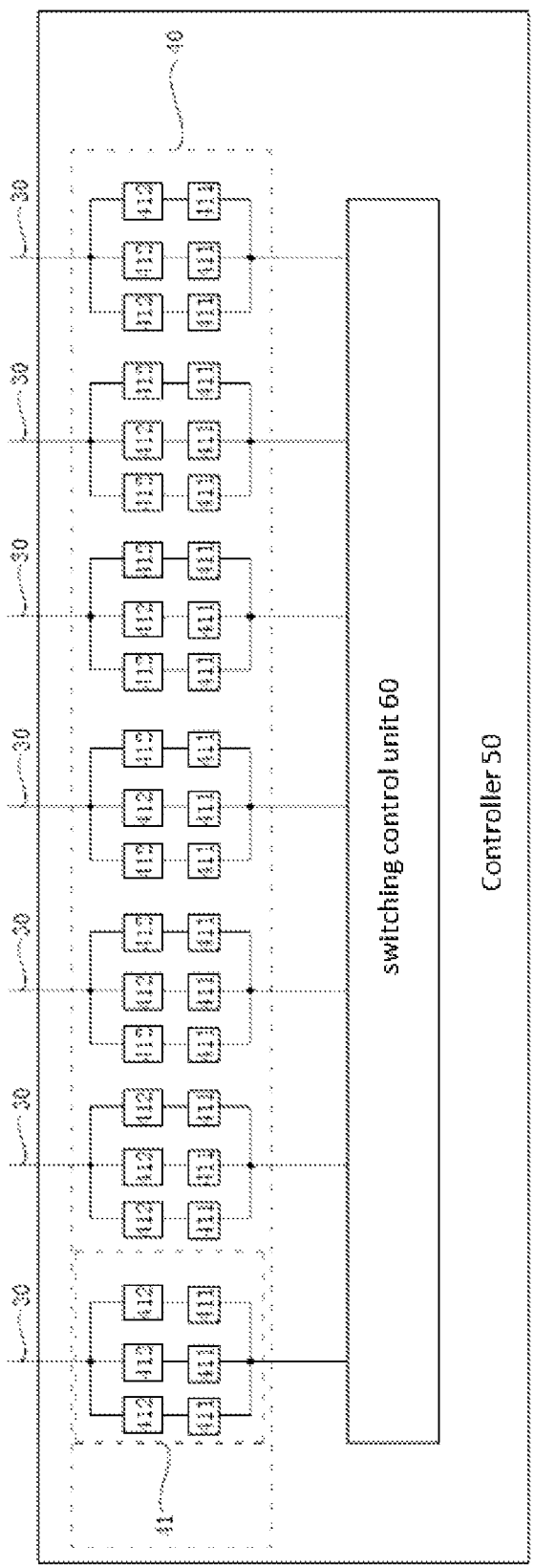
FIG. 2 is an inner arrangement schematic view of an impedance adjusting unit according to the embodiment of the present invention.

Refer to FIG. 1 and FIG. 2, the impedance adjusting unit 40 according to the embodiment of the present invention comprises a plurality of parallel resistor units 41. Each first direction sensing series 21 is connected to a corresponding parallel resistor unit 41 by a corresponding connection wire 30, and each second direction sensing series 22 is connected to a corresponding parallel resistor unit 41 by a corresponding connection wire 30. That is, an amount of the parallel resistor unit 41 is equal to a sum of the amount of the first direction sensing series 21 and the second direction sensing series 22.

Each parallel resistor unit 41 is arranged inside of the controller 50, due to each parallel resistor unit 41 is connected to other components inside the controller 50, it is understood that each parallel resistor unit 41 can be connected to the controller 50.

Therefore, the controller 50 achieves the goal to adjust impedance of each connection wires 30 via adjusting impedance of each parallel resistor unit 41.

The parallel resistor unit 41 according to the embodiment of the present invention comprises a plurality of controllable switches 411 and a plurality of resistors in parallel 412, wherein, each resistor 412 is connected to the controller 50 by the corresponding controllable switch 411. Thus, the controller 50 controls the whole impedance of each the parallel resistor 41, and then adjusts impedance of each connection wire 30 via controlling a turn-on state or turn-off state of each controllable switch 411. In addition, in the present embodiments, an amount of resistors 412 of each the parallel rector unit 41 is, for example: three, but the present invention is not limited hereto, the amount of resistors 412 of each parallel resistors 41 can be more than three.

Therefore, the touch panel according to the embodiments of the present invention further comprises a switching control unit 60. In the present embodiment, the switching control unit 60 is embedded in the controller 50 to improve integrity of the controller 50, but the present invention is not limited hereto, the switching control unit 60 is also arranged directly at the substrate 10 and then arranged outside the controller 50. The switching control unit 60 accepts controlling a turn-on state or turn-off state of each controllable switch 411 from the controller 50.

Otherwise, further description according to the embodiment of the present invention set forth as below is, the first sensing pad 211 and the second sensing pad 221 are intersected without overlapping or contacting, and are arranged on the same layer with the first bridging wire 212 or the second bridging wire 222. But the present invention is not limited hereto as position relationships of the first sensing pad 211 and the second sensing pad 222 as shown in FIG. 1; in other embodiment of the present invention, for example, the first sensing pad 211 and the second sensing pad 221 can be arranged on different layers, and the first sensing pad 211 and the second sensing pad 222 can be overlapped on space; in other words, the first sensing pad 211 and the first bridging wire 212 can be formed by a conduct layer with a same pattern, and the second sensing pad 221 and the second bridging wire 222 can be formed by another conduct layer of a same pattern.

The substrate 10 according to the embodiment of the present invention can be, for example: a single-layer glass substrate, quartz substrate or plastic substrate. In other embodiment of the present invention, the substrate 10 is a color filter substrate or a thin film transistor array substrate. Several embodiments that the substrate is a color filter substrate or thin film transistor array substrate will be detailedly described as below.

Figure 3:
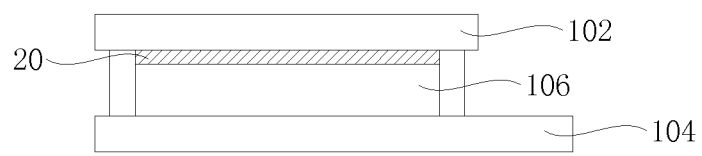
FIG. 3 is a sectional schematic view of touch display panel according to the embodiment of the present invention.
Figure 4:
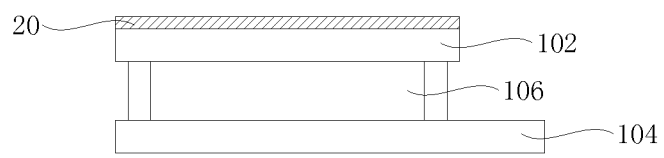
FIG. 4 is a sectional schematic view of touch display panel according to another embodiment of the present invention.
Figure 5:
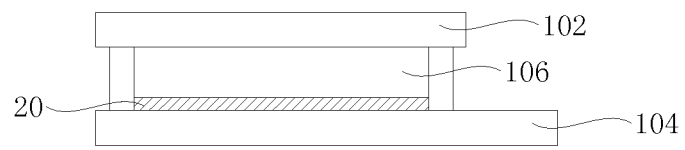
FIG. 5 is a sectional schematic view of touch display panel according to a further embodiment of the present invention.

FIG. 3 to FIG. 5 are sectional schematic views of touch display panel according to several embodiments of the present invention.

Refer to FIG. 3 to FIG. 5, touch display panel 10*a* to 10*c* comprise the touch unit array 20, the color filter substrate 102, the thin film transistor array substrate 104 and a display material layer 106, wherein, the display material layer 106 is clamped between color filter substrate 102 and thin film transistor array substrate 104.

As shown in FIG. 3, the touch unit array 20 is arranged on the inner surface of the color filter substrate 102. As shown in FIG. 4, touch unit array 20 is arranged on the outer surface of the color filter substrate 102. As shown in FIG. 5, touch unit array 20 is arranged on the inner surface of the thin film transistor array substrate 104. However, the present invention is not limited hereto; the substrate of a non-color filter can be substituted for the color filter substrate 102 if the thin film transistor array substrate 104 is designed to a substrate integrated the Color Filter On Array (Color Filter On Array, COA) and the thin film transistor array.

Materials of the display material layer 106 can be, for example: non-self-luminous materials, self-luminous materials or other suitable materials. The non-self-luminous material is, for example: liquid crystal, electrophoresis or other suitable materials. The self-luminous materials are: organic luminescent materials, inorganic luminescent materials or other suitable materials. In other words, a touch display panel 10*a* to 10*c* can be a liquid crystal display panel, and also can be an organic luminescent display panel or an electrophoresis display panel.

In addition, according to the embodiments of the present invention, shapes of the first sensing pad and/or the second sensing pad are diamond shaped (as shown in FIG. 1). But the present invention is not limited hereto, refer to FIG. 6*a* to FIG. 6*e*, shapes of the first sensing pad and/or the second sensing pad can be trapezoid shaped (as shown in FIG. 6*a*), cruciform shaped (as shown in FIG. 6*b*), triangle shaped (as shown in FIG. 6*c*), hexagon shaped (as shown in FIG. 6*d*) or pentagon shaped (as shown in FIG. 6*e*).

Although the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A touch panel, wherein, comprises: a substrate, a touch unit array, a plurality of connection wires, an impedance adjusting unit and a controller; the touch unit array, the connection wires, the impedance adjusting unit and the controller are arranged on the substrate, the touch unit array connects to the impedance adjusting unit through the connection wires, the impedance adjusting unit connects to the controller, and the impedance adjusting unit is processing adjustment to impedance of each of the connection wires to make impedance of each of the connection wires consistent, wherein the impedance adjusting unit comprises a plurality of parallel resistor units, each of the connection wires connects to a corresponding parallel resistor unit, and the parallel resistor units all connect to the controller;

each of the parallel resistor units comprises a plurality of controllable switches and a plurality of resistors in parallel, each of the resistors is connected to the controller by the corresponding controllable switch, wherein the controller controls the whole impedance of each of the parallel resistor units via controlling a turn-on state or turn-off state of each of the controllable switches, thereby adjusting impedance of each of the connection wires.

2. The touch panel according to claim 1, wherein, the touch panel comprising; switching control unit, wherein the switching control unit is arranged on the substrate, and the switching control unit is used to control the controllable switch for turning on or turning off.

3. The touch panel according to claim 2, wherein, both the impedance adjusting unit and the switching control unit are embedded in the controller.

4. The touch panel according to claim 1, wherein, the substrate is a color filter substrate or a thin film transistor array substrate.

5. The touch panel according to claim 1, wherein, the touch unit array comprising:

a plurality of first direction sensing series, the plurality of first direction sensing series separates from each other, each of the first direction sensing series comprises a plurality of first sensing pads in series and a plurality of first bridging wires, each of the first bridging wire cascades adjacent the first sensing pad, and each direction sensing series connects to the impedance adjusting unit through the corresponding plurality connection wires;

a plurality of second direction sensing series, the plurality of second direction sensing series separate from each other, each of the second direction sensing series comprises a plurality of second sensing pad in series and a plurality of second bridging wires, each second bridging wire cascades adjacent the second sensing pad, and each of the direction sensing series connect to the impedance adjusting unit through the corresponding plurality connection wires;

Wherein, the first bridging wire and the second bridging wire are arranged on different layer.

6. The touch panel according to claim 5, wherein, the first sensing pad, the second sensing pad and the first bridging wire are arranged on the same layer.

7. The touch panel according to claim 5, wherein, the first sensing pad, the second sensing pad and the second bridging wire are arranged on the same layer.

8. The touch panel according to claim 5, wherein, shapes of the first sensing pad and/or the second sensing pad are diamond shaped, trapezoid shaped, cruciform shaped, triangle shaped, hexagon shaped or pentagon shaped.

9. The touch panel according to claim 6, wherein, shapes of the first sensing pad and/or the second sensing pad are diamond shaped, trapezoid shaped, cruciform shaped, triangle shaped, hexagon shaped or pentagon shaped.

10. The touch panel according to claim 7, wherein, shapes of the first sensing pad and/or the second sensing pad are diamond shaped, trapezoid shaped, cruciform shaped, triangle shaped, hexagon shaped or pentagon shaped.

* * * * *